(12) United States Patent
Lillibridge

(10) Patent No.: US 8,589,406 B2
(45) Date of Patent: Nov. 19, 2013

(54) DEDUPLICATION WHILE REBUILDING INDEXES

(75) Inventor: Mark David Lillibridge, Mountain View, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 61 days.

(21) Appl. No.: 13/040,216

(22) Filed: Mar. 3, 2011

(65) Prior Publication Data

US 2012/0226699 A1 Sep. 6, 2012

(51) Int. Cl.
  *G06F 7/00* (2006.01)
  *G06F 17/30* (2006.01)
(52) U.S. Cl.
  USPC .......................................... 707/747; 707/696
(58) Field of Classification Search
  USPC .................. 707/661, 664, 747, 696
  See application file for complete search history.

(56) References Cited

U.S. PATENT DOCUMENTS

| | | | | |
|---|---|---|---|---|
| 5,732,265 A * | 3/1998 | Dewitt et al. | ................... | 1/1 |
| 6,928,526 B1 * | 8/2005 | Zhu et al. | .................... | 711/154 |
| 7,949,662 B2 * | 5/2011 | Farber et al. | ................... | 707/747 |
| 8,370,580 B2 * | 2/2013 | Mobarak et al. | .............. | 711/133 |
| 2006/0282457 A1 * | 12/2006 | Williams | ........................ | 707/102 |
| 2007/0088912 A1 * | 4/2007 | Mukherjee et al. | ........... | 711/112 |
| 2008/0294696 A1 * | 11/2008 | Frandzel | ......................... | 707/200 |
| 2008/0313496 A1 * | 12/2008 | Prabhakaran et al. | ......... | 714/15 |
| 2009/0132619 A1 * | 5/2009 | Arakawa et al. | .............. | 707/205 |
| 2009/0271454 A1 * | 10/2009 | Anglin et al. | ................. | 707/204 |
| 2010/0082558 A1 * | 4/2010 | Anglin et al. | ................. | 707/694 |
| 2010/0217953 A1 * | 8/2010 | Beaman et al. | ............... | 711/216 |
| 2011/0225129 A1 * | 9/2011 | Agrawal | ........................ | 707/692 |
| 2011/0238635 A1 * | 9/2011 | Leppard | ........................ | 707/693 |
| 2011/0307447 A1 * | 12/2011 | Sabaa et al. | ................... | 707/637 |
| 2011/0307659 A1 * | 12/2011 | Hans et al. | .................... | 711/114 |
| 2011/0307683 A1 * | 12/2011 | Spackman | .................... | 711/216 |
| 2012/0005443 A1 * | 1/2012 | Flynn et al. | ................... | 711/163 |
| 2012/0016845 A1 * | 1/2012 | Bates | ............................ | 707/692 |
| 2012/0084445 A1 * | 4/2012 | Brock et al. | ................... | 709/226 |
| 2012/0158670 A1 * | 6/2012 | Sharma et al. | ................ | 707/692 |
| 2012/0221523 A1 * | 8/2012 | Bendakovsky et al. | ........ | 707/640 |
| 2013/0036289 A1 * | 2/2013 | Welnicki et al. | .............. | 711/173 |

* cited by examiner

*Primary Examiner* — Wilson Lee
*Assistant Examiner* — Jessica N Le

(57) ABSTRACT

Systems and methods of deduplicating while loading index entries are disclosed. An example method includes loading a first group of index entries into an index. The example method also includes deduplicating data using the index before loading the first group of index entries is completed.

19 Claims, 4 Drawing Sheets

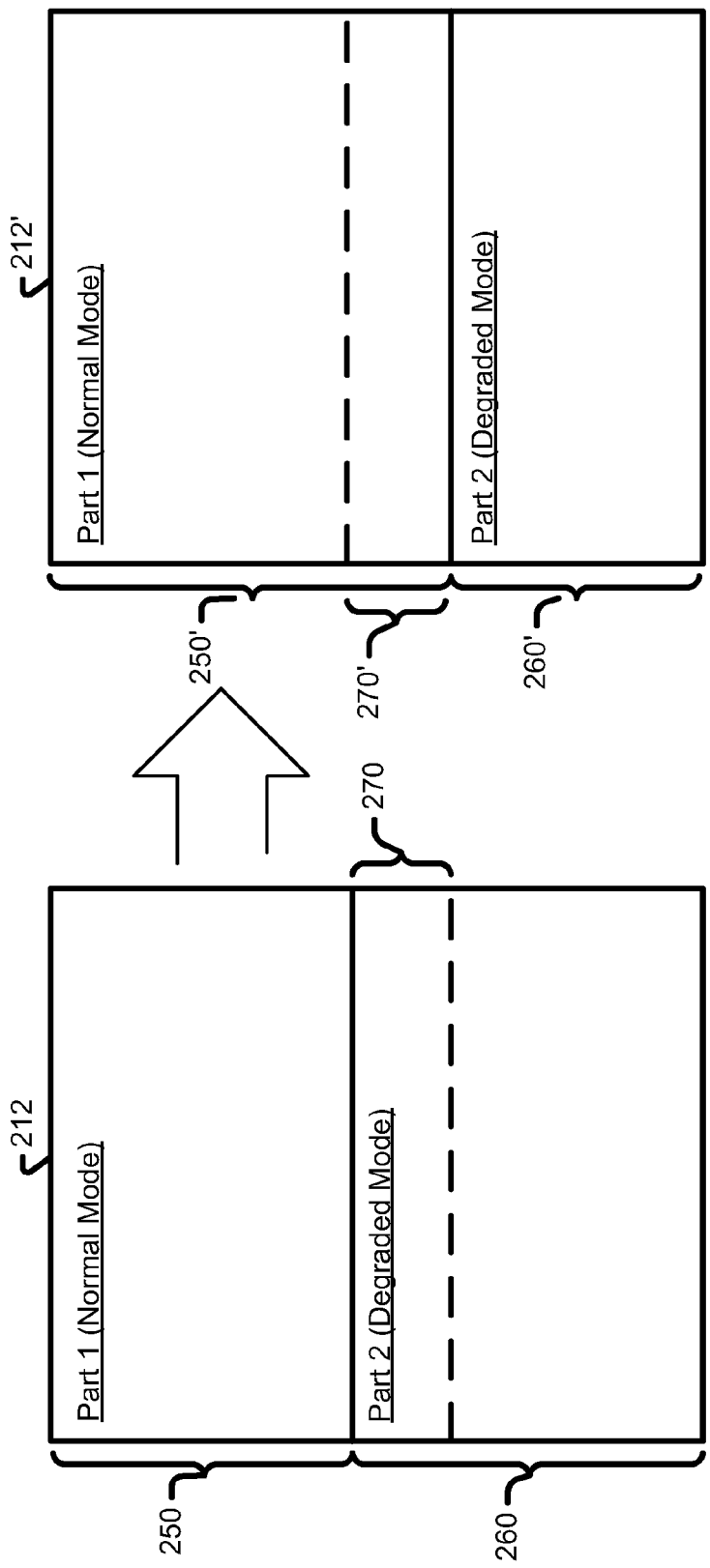

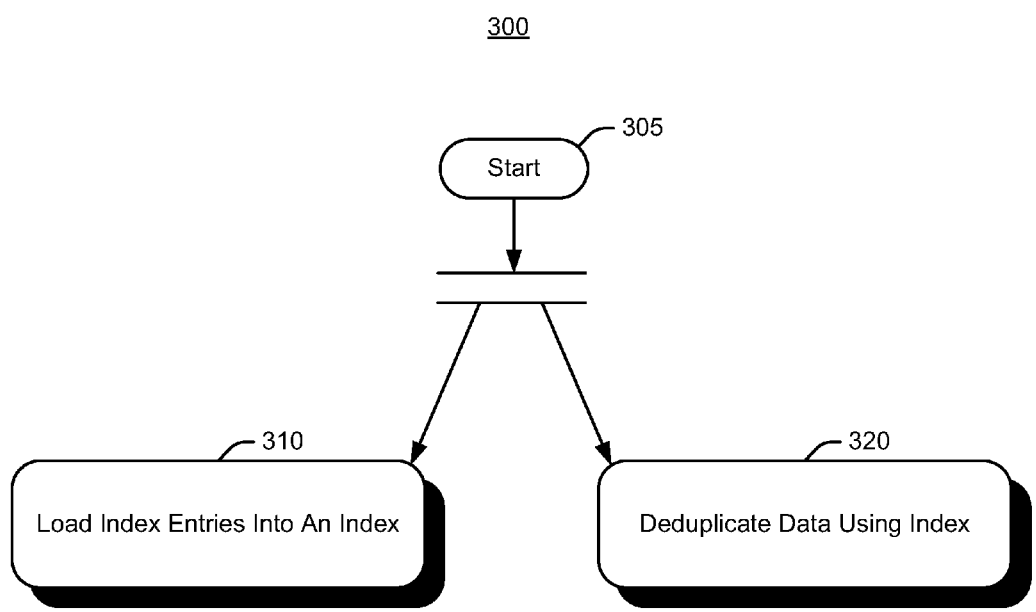

DEDUPLICATION WHILE REBUILDING INDEXES

BACKGROUND

Storage devices commonly implement data operations using deduplication for data storage. Deduplication is a known technique which reduces the storage capacity needed to store data as compared to other techniques. An in-line storage deduplication system is a storage system that deduplicates as data arrives. That is, whenever a block is written with content identical to a block already stored, a new copy of the same content is not made. Instead a reference is made to the existing copy.

In order to do this, the system may use a "logical address to physical address" table and a "block hash to physical address" table. The logical address to physical address table maps the logical addresses that blocks are written to, to the actual physical addresses in the data store where the contents of the block logically at that address are stored. In deduplication, multiple logical addresses may be mapped to the same physical address. For efficiency, the logical address to physical address table often also includes a hash of the block pointed to. Some systems may use multiple logical address to physical address tables, dividing up the logical address space.

The block hash to physical address table enables determining if contents of a block with a given hash are already stored, and if so, where that block is. This table often includes additional information, such as reference counts for the physical address pointed to so as to enable "garbage collection" (i.e., removal of contents no longer being used or no longer pointed to). This table can be sizable (e.g., about 60 GB for 8 TB of storage) and may be held in fast, often completely or partially volatile memory.

Unfortunately, after a restart or crash, it may take a substantial time to reload the block hash to physical address table (e.g., reloading a 60 GB table at 100 MB/s takes about 10 minutes), or to rebuild this table (potentially hours). Forcing the user(s) to wait while the table is reloading or rebuilding is undesirable.

BRIEF DESCRIPTION OF THE DRAWINGS

FIG. 2a illustrates example operation of the system shown in FIG. 2.

FIG. 3 is a flowchart illustrating example operations which may be implemented for deduplication while rebuilding indexes.

DETAILED DESCRIPTION

The systems and methods disclosed herein enable deduplication to continue in a degraded mode while waiting for an index to load and/or rebuild. Journaling techniques may be used to ensure that a correct copy of the index (i.e., a copy that is consistent with the state of the storage) is available on disk, or can be readily computed from available information when the system starts up to enable a straightforward and relatively quick loading of the index. However, these techniques can be complicated and generally have a negative performance impact (e.g., information may need to be committed to non-volatile storage after every block write), and may require additional hardware to implement. Instead, the systems and methods herein describe a simpler and more reliable approach for loading and/or rebuilding an index. In an example, a stale or only mostly correct copy of the index is initially loaded and used during runtime while a correct copy of the index is computed or "rebuilt." As the correct copy is made available, the correct copy can be loaded and used during runtime. Because the systems and methods disclosed herein enable deduplication to continue in a degraded mode using the stale copy, a long rebuild time can be tolerated.

Figure 1:
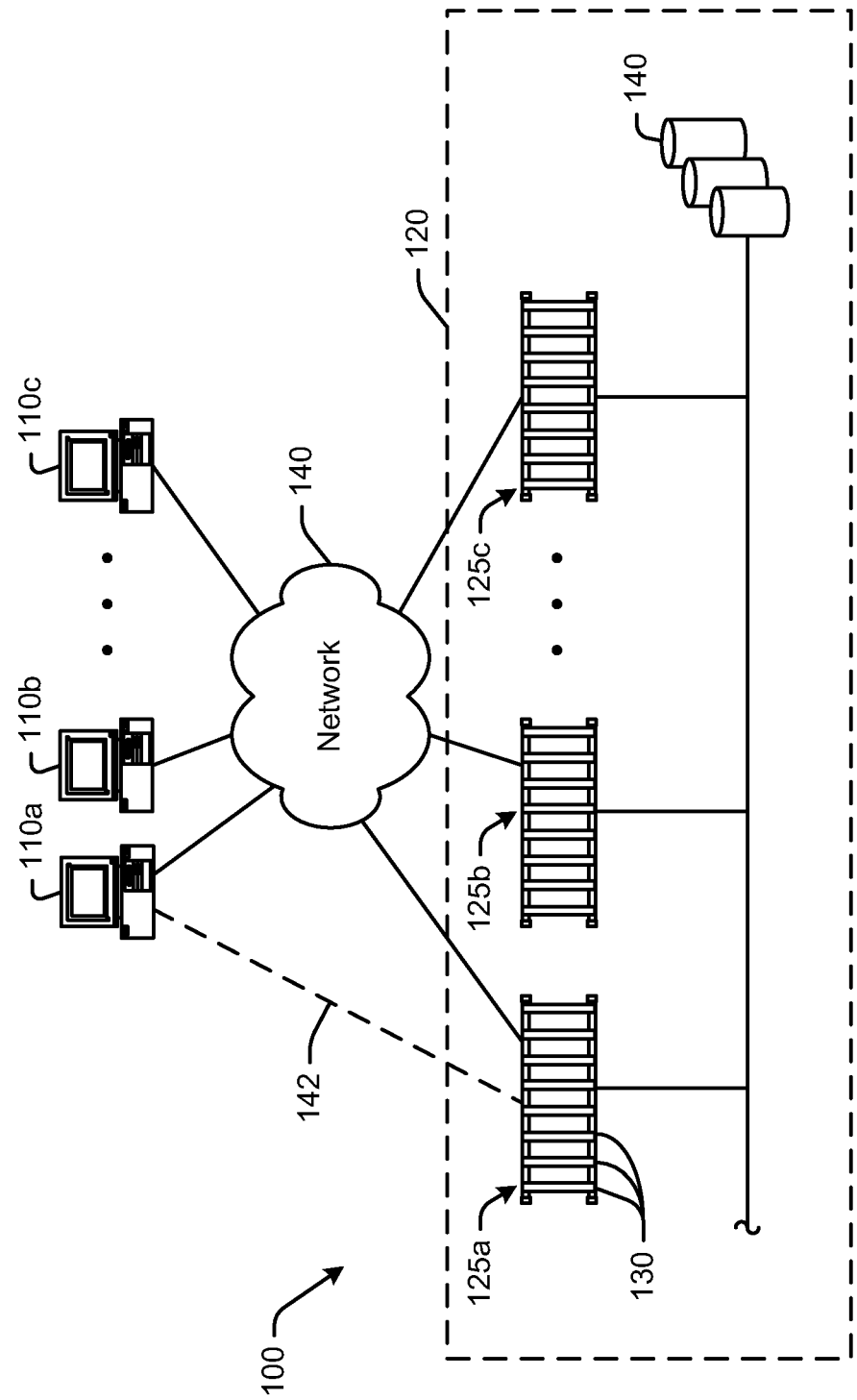
FIG. 1 is a high-level diagram showing an example of a computer system which may implement deduplication while rebuilding indexes.

FIG. 1 is a high-level diagram showing an example of a computer system 100 which may implement deduplication while rebuilding indexes. Virtualizing computer resources is becoming widely used in enterprise environments to provide logically separate virtual machines that can be accessed by terminal devices 110a-c, while reducing the need for powerful individual physical computing systems.

The terms "terminal" and "terminals" as used herein refer to any computing device through which one or more users may access the resources of a server farm 120. The computing devices may include any of a wide variety of computing systems, such as stand-alone personal desktop or laptop computers (PC), workstations, personal digital assistants (PDAs), mobile devices, server computers, or appliances, to name only a few examples. However, in order to fully realize the benefits of a virtual machine environment, the terminals may be provided with only limited data processing and storage capabilities.

For example, each of the 110a-c terminals may include at least some memory, storage, and a degree of data processing capability sufficient to manage a connection to the server farm 120 via network 140 and/or direct connection 142. In an example, the terminals may be connected to the server farm 120 via a "front-end" communications network 140 and/or direct connection (illustrated by dashed line 142). The communications network 140 may include a local area network (LAN) and/or wide area network (WAN).

In the example shown in FIG. 1, the server farm 120 may include a plurality of racks 125a-c comprised of individual server blades 130. The racks 125a-c may be communicatively coupled to a storage pool 140 (e.g., a redundant array of inexpensive disks (RAID)). For example, the storage pool 140 may be provided via a "back-end" network, such as an inter-device LAN. The server blades 130 and/or storage pool 140 may be physically located in close proximity to one another (e.g., in a single data center). In another example, at least a portion of the racks 125a-c and/or storage pool 140 may be "off-site" or physically remote from one another (e.g., to provide a degree of fail over capability). It is noted that examples wherein the server blades 130 and storage pool 140 are stand-alone devices (as opposed to blades in a rack environment) are also contemplated as being within the scope of this description.

It is noted that the system 100 is described herein for purposes of illustration. However, the systems and methods may be utilized with any suitable system architecture, and are not limited to the system 100 shown in FIG. 1.

As noted above, the terminals 110a-c may have only limited processing and data storage capabilities. The blades 130 may each run a number of virtual machines, with each terminal 110a-c connecting to a single virtual machine. Each blade 130 provides sufficient computational capacity to each virtual machine so that the users of terminals 110a-c may get their work done. Because most user machines spend the majority of the time idle, waiting for users to provide input, a single blade 130 may be sufficient to run multiple virtual machines, providing cost savings over a similar number of physical machines.

Each virtual machine may be instantiated by booting from a disk image including the operating system, device drivers, and application software. These virtual disk images are stored in the storage pool 140 either as files (e.g., each virtual disk image corresponds to a single file in a file system provided by storage pool 140) or a continuous ranges of blocks (e.g., a LUN or logical unit provided by a block interface) provided by storage pool 140. In an example, each virtual machine has its own virtual disk image.

At least some portion of these disk images is likely to be shared. For example, multiple virtual machines may use the same device drivers, application software, etc. Accordingly, the storage space used for each of the individual disk images can be reduced. An approach uses deduplication, which reduces the total amount of storage needed for the individual disk images.

Deduplication has become popular because as data growth soars, the cost of storing that data also increases in proportion to the need for more storage capacity. Deduplication reduces the cost of storing multiple copies of the same file. Disk images tend to have a great deal of repetitive data (e.g., shared device drivers), and therefore virtual machine disk images may be particularly well suited to data deduplication.

Deduplication generally refers to the global reduction of redundant data. In the deduplication process, duplicate data is deleted, leaving fewer copies (e.g., only one copy) of the data to be stored. Accordingly, deduplication may be used to reduce the storage capacity needed, because only unique data is stored. That is, where a data file is stored X times (e.g., in X disk images), X instances of that data file are stored, multiplying the total storage space required by X. In deduplication, however, the data file's blocks are only stored once, with each virtual disk image that contains that data file having pointers to those blocks.

As an illustration, each virtual disk image may include a list of pointers, one for each logical disk block, to unique blocks, which may reside in a common storage area. For example, a single printer driver used by ten separate virtual machines may reside in the common storage area, with those 10 virtual machine's virtual disk images containing pointers to the blocks of the printer driver. When a virtual machine accesses the printer driver (e.g., for a printing operation), it requests the relevant virtual disk blocks, which in turn causes the blade 130 the virtual machine is running on to request those blocks from the storage pool 140. The storage pool 140 turns those requests into requests for physical disk blocks via the pointers of the relevant virtual disk image and returns the blocks to the blade/virtual machine.

When a block is written with content identical to a block already stored, a new copy of the same content does not need to be made. Instead a reference is made to the existing copy. In order to manage this, the storage system 100 may implement a "logical address to physical address" table and a "block hash to physical address" table. The logical address to physical address table maps the logical addresses that blocks are written to the actual physical addresses in the store where the contents of the block logically at that address is stored. In deduplication, multiple logical addresses may be mapped to the same physical address. For efficiency, the logical address to physical address tables may also include a hash of the block pointed to.

The block hash to physical address table enables determining if contents of a block with a given hash have already been stored, and if so, where that block is. This table often includes additional information such as reference counts for the physical address pointed to so as to enable "garbage collection" (i.e., removal of contents no longer being used or no longer pointed to). This table can be sizable (e.g., about 60 GB for 8 TB of storage) and may be held in fast, often completely or partially volatile memory.

After a restart or crash, it may take a substantial time to reload this table (e.g., reloading a 60 GB table at 100 MB/s takes about 10 minutes) or rebuild this table (potentially hours). The systems and methods described herein enable deduplication to continue, albeit in a somewhat degraded mode, while waiting for an index to load and/or rebuild. Accordingly, a simpler and more reliable method of loading and/or rebuilding may be used without the need for sophisticated journaling techniques. Such systems and methods satisfy service level objectives for the storage system, as will be better understood from the following discussion.

Figure 2:
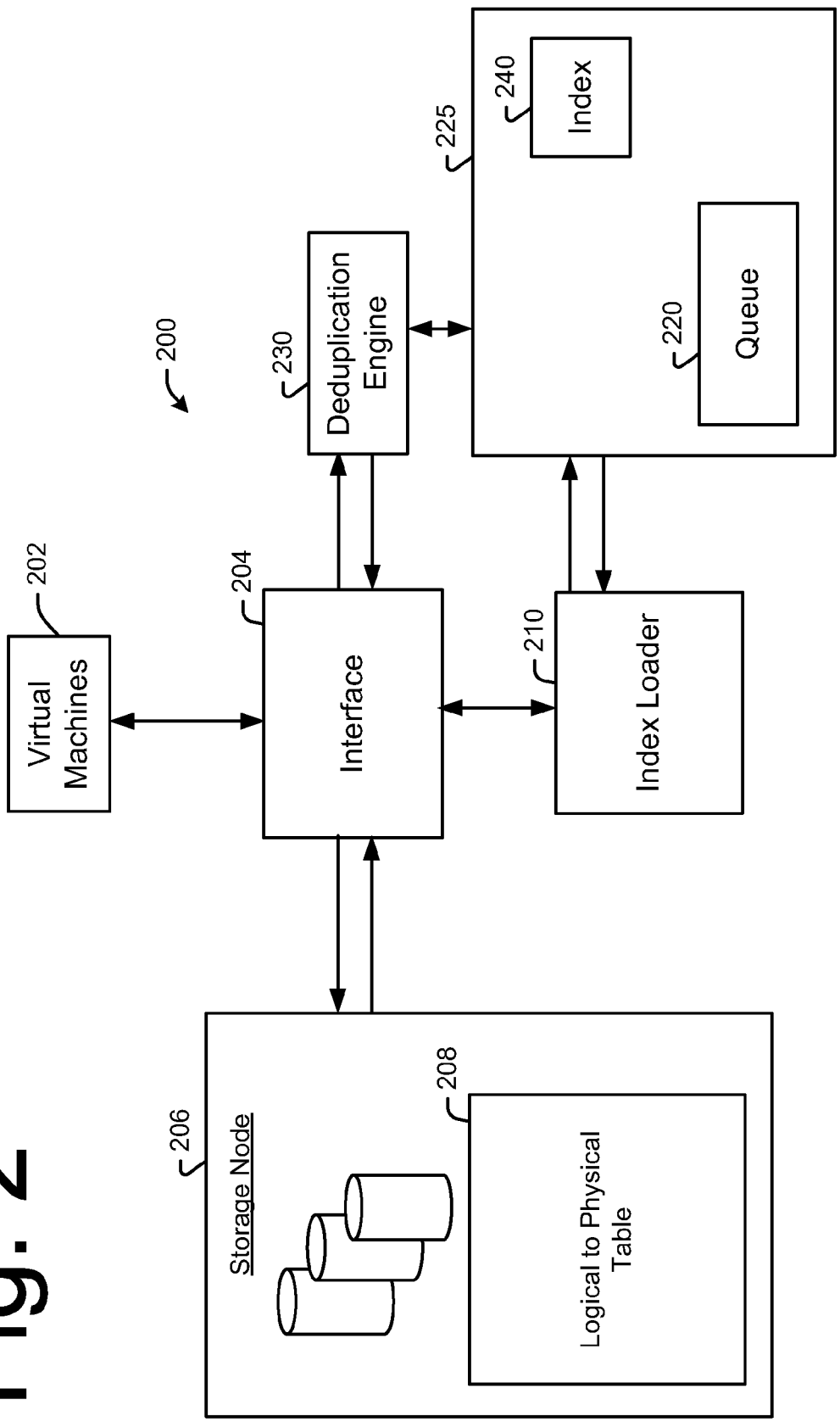
FIG. 2 shows an example software architecture which may be implemented in the storage system shown in FIG. 1 for deduplication while rebuilding indexes.

FIG. 2 shows an example software architecture 200 which may be implemented in the system 100 shown in FIG. 1 for deduplication while rebuilding indexes. In an example, the software architecture 200 may be associated with a plurality of virtual machines 202 (e.g., providing backing store for their virtual disk images) for deduplication at storage node(s) 206 via an interface 204. The software architecture 200 may include a physical address to logical address table 208. The software architecture 200 may also include an index loader 210 configured to load index entries into index 240 located in storage 225 (e.g., RAM) for deduplication. Index 240 may be an example of a block hash to physical address table. A queue 220 may be configured to hold change requests for some of the entries of index 240. A deduplication engine 230 is configured to deduplicate data while index entries are being loaded. The components shown in FIG. 2 are provided only for purposes of illustration, and are not intended to be limiting.

FIG. 2a illustrates example operation of the system 200 shown in FIG. 2. During operation, the deduplication engine 230 may be configured to divide the key space 212 of the index 240 into at least two parts, a first part 250 operating in a normal mode, and a second part 260 operating in a degraded mode. It is noted that the two parts 250 and 260 need not be continuous. For example, the parts 250 and 260 may each comprise a plurality of fragments. Each part may be empty at a different given time. The deduplication engine 230 may treat index entries of index 240 differently depending on which part of the key space 212 their associated keys belong to.

The deduplication engine 230 moves a first portion 270 of the key space 212 from the second part 260 of the key space to the first part 250 of the key space. As before, the first portion 270 need not be continuous. The results of this move are illustrated by key space 212', wherein the first portion 270' now belongs to the first part 250' of the key space (which has grown), and the second part 260' has shrunk. By repeatedly moving portions from the second part to the first part, the deduplication engine 230 can gradually transform the index so that the system can operate only in normal mode. In that case, part two is empty and part one includes the entire index key space. In an example, the first portion 270 may include the entire second part 260 and a single move suffices to empty part two.

In an example, the deduplication engine 230 may not deduplicate a block of data when a hash of the block of data is currently in the second part 260 of the key space. Blocks of data with hashes in the first part 250 of the key space may be deduplicated normally, using the index entry if any of index 240 associated with that hash. Because the part (e.g., part one 250 or two 260) of the key space that a hash is in may change over time, the same block that earlier was not eligible for deduplication, may later be eligible for deduplication when presented at a later time.

The deduplication engine 230 may associate with each index entry a count of references to an associated stored block. The counts may not be relied on for index entries with keys currently in the second part 260 of the key space. The counts for other index entries may be relied upon by the deduplication engine 230. The associated reference counts may be used to perform garbage collection. An associated count of zero that may be relied upon may indicate that the associated block of storage is "garbage" and may be freed. Garbage collection may not be performed until part two 260 is empty.

During operation, the deduplication engine 230 may defer updates to index entries with keys currently in the second part 260 of the key space 212. In some examples, these updates may be stored in queue 220. Updates may include inserting an index entry, increasing or decreasing the reference count of an entry, changing the location of an associated stored block, and removing an index entry. Moving the first portion 270 of the key space 212 may include the deduplication engine 230 applying the deferred updates for the index entries in the first portion 270 of the key space to those entries. Once applied, the entries may be removed from queue 220. The deferred updates for other index entries may remain deferred.

It is noted that any of a wide variety of different data structures may be implemented. For example, instead of simply keeping a queue 220 of deferred operations, a hash table of entries may be used to summarize a net effect (e.g., the net change in reference count for a given entry caused by the operations). This information may instead be included in the index 240 rather than being part of a separate table.

To save space, the net change information may collapse some outcomes. For example, a change to a reference count may be stored as $-2$, $-1$, $0$, $+1$, $+2$, or $+\infty$. Additional changes to that reference count may cause this state to change. For example, $+\infty +/- $any integer$=+\infty$, $-2-1=-2$. This approximation may be useful because it ensures that the result of applying the approximation yields an equal or higher reference count over not doing the approximation. The approximation also helps ensure that valid data is not garbage collected by mistake. The approximation can, however, cause some garbage to be retained, potentially forever.

Also during operation, in an example, the deduplication engine 230 may deduplicate a block of data having a hash in the second part 260 of the key space only after an associated index entry is verified. Index entries with associated keys in the second part 260 may be considered either trusted or untrusted, in particular, with regards to whether an associated storage block actually contains the block with their key as a hash. These entries may be initially untrusted, but be considered trusted after they have been verified. Verification may involve reading the block from the associated storage location and comparing its hash to the key of the index entry in question. If a match occurs, then the entry may be considered trusted and used for deduplication. If the match fails, then the entry remains untrusted and may be removed to avoid wasted re-verification.

Avoiding re-verification may require the garbage collector to not move blocks until part two 260 is empty. The index entries in part one 250 may always be trusted. It is undesirable to deduplicate a block based on an index entry whose key is in the second part 260 that has not been verified, because the result may be data corruption (e.g., the storage location pointed to may not actually contain that block).

In an example, the index loader 210 may be configured to load a first group of index entries into a part of the index 240 corresponding to the second part 260 of the key space 212. The deduplication engine 230 may initially consider the first group of index entries as untrusted. The first group of index entries may be a stale copy of the index, such as a checkpoint of an earlier version of the index 240. These entries cannot be trusted because the index 240 may have changed after the checkpoint was taken and before a crash occurred, necessitating the current loading of the index 240. Note that benefit is still realized from the first group of index entries. If most of the entries are correct (e.g., the checkpoint is fairly recent), the system can still deduplicate against those entries with the extra cost only being the verification step. Without the entries, the system would not be able to deduplicate at all until more accurate index entries became available.

The deduplication engine 230 may start up with all of key space 212 in part two 260 and none in part one 250. The index loader 210 may start loading the first group of index entries. Deduplication can proceed while the first group of index entries is still loading. If a block arrives before its associated index entry is loaded, that block may not be deduplicated. After more accurate index entries are available, the use of the first group of index entries can be phased out.

The index loader 210 may be further configured to compute a second group of index entries, and load the second group of index entries. The second group of index entries may be computed so that the second group of index entries is accurate as of the time the deduplication engine started. The second group of index entries may be computed by applying log(s) to the latest checkpoint (e.g., the first group of index entries), or by inspecting the logical address to physical address table(s), or inspecting file manifests.

Moving the first portion 270 of the key space 212 may include updating the first portion 270 of the index 240 (i.e., the index entries of index 240 whose associated keys lie in first portion 270), based in part on the first portion 270 of the second group of index entries. Updating may involve simply replacing the entries in first portion 270 with the entries from the first portion 270 of the second group. After all of part two 260 is transitioned to part one 250, the system will have phased out the first group of entries in favor of the second group of entries.

As part of the updating, the deferred updates for the first portion 270 may be applied after the replacement is done. This may result in a set of index entries for first portion 270 that is equivalent to what would have been obtained by starting the system with the second group of index entries and applying updates to the first portion 270 as the updates came in. By deferring and applying updates in this way, the system is able to compute a second group of index entries that is correct with respect to the storage 206, as it was at start-up, and still result in an index 240 that is correct with regards to the current storage 206.

Other more complicated methods of updating are also possible. For example, index entries that have been verified and have no corresponding entry in the second group of entries may be retained, possibly in modified form. In another example, moving of first portion 270 may be done atomically with respect to deduplication operations. That is, a deduplication operation that needs to refer to first portion 270 of index 240 may not overlap with the moving of first portion 270.

A first portion 270 can be moved after the associated entries of the second group are computed and loaded. The term "loaded" means available in memory. The system can thus move portions of the key space 212 as entries of the second group are loaded. This makes those entries available for deduplication as soon as possible. Loading, likewise, can be preformed incrementally as the second group of entries is computed.

In another example, the index loader 210 may be configured to compute a second group of index entries, and load the second group of index entries. Moving the first portion of the key space 270 may include updating the first portion 270 of the index based in part on the first portion 270 of the entries belonging to the second group. In this example, a first group of entries is not loaded. Indeed, no such group of entries may exist. Without a source of stale index entries, the system may start with an empty index while computing an accurate second group of entries.

In an example, the software architecture 200 implements program code (e.g., firmware and/or software and/or other logic instructions) stored on computer readable medium or media and executable by processor(s) to perform the operations described below.

The program code enables the storage system to operate (albeit in a somewhat degraded mode), while index restoration (loading and/or rebuilding) is in progress. This may be accomplished by allow deduplication to run using an approximate index while a correct index is built/loaded. Because the index is changing while a correct index is being acquired, changes made during this time may be tracked and then merged with the correct index entries.

In an example, deduplication proceeds while waiting for a previously correct version of the index to load. Here, the system may be rebooting after a normal shutdown procedure. Because the system was shut down normally, it is likely that the correct version of the index was written out to storage node 206 prior to the system shutting down. Therefore, the system can run in a degraded mode while the (previously) correct index loads.

Duplicates are not detected for blocks whose hashes are in part two 260 of key space 212. This produces duplicate content that can be removed later. Initially, the entire key space 212 is in part two 260, but transitions to part one 250, either all at once, after loading is finished, or incrementally as loading proceeds.

Updates to the index (such as new blocks, new references to existing blocks, and the removal of existing references to existing blocks) may be deferred in queue 220 if the updates concern blocks currently in part two 260. These updates may be applied as part two 260 is transitioned to part one 250. The index entries in part one 250 are correct with respect to the current storage 206 here because those entries started with the loaded index entries and because the loaded index entries were correct with respect to storage 206 at start up, and have received every update since. After the load is complete, the system can exit degraded mode.

In another example, the system is operating using (the loaded part of) a stale, or "untrusted" version of the index, while waiting for a more recent, previously correct version of the index to be loaded or rebuilt. In this example, the stale index is mostly (albeit not necessarily 100%) accurate. Perhaps there is an old checkpoint, but the system did not write out sufficient updates before the system was turned off. In this case, the checkpoint is available for loading, but is out of date. Because this index version is not completely trustworthy, the system will rebuild the index. And because rebuilding the index takes time during which deduplication continues, by the time this process is complete, the rebuilt index may be stale. The index was correct at a known time, however. Therefore, the system begins rebuilding the index from the logical address to physical address tables and starts loading the untrusted version of the index. It is noted that because the logical address to physical address tables are updated while the index rebuilding process is running, the index rebuilding process may first need to make an immutable snapshot of the logical address to physical address tables to operate on.

A correct version of the index for a given immutable set of logical address to physical address tables can be created in parallel using map reduce. For example, map over each (part of) logical address to physical address table, turning each block reference into a tuple (H, P, 1), where H is the block hash and P is the associated physical address; and then reduce by combining tuples (H, P, i) and (H, P, k) into (H, P, j+k). This example computes the correct reference count for the block at P.

The system deduplicates similarly as described for the previous example, unless information is available from the untrusted index and not from the index being rebuilt. In this case, the information is treated as a hint, which can be verified. If verification of an entry where the block with hash H lives at P succeeds, then the system knows the location P where the contents with hash H live and the system can deduplicate blocks with that hash. To avoid repeatedly verifying the same entry, the results of the verification may be stored and recalled.

Once the index rebuilding procedure is finished and the resulting index is completely loaded, the system is no longer running in degraded mode. As the rebuilt index is loaded, the corresponding entries of the untrusted index may be discarded because those entries are no longer needed. In this example, the rebuilding procedure produces an index that was correct as of when operations began, and thus, applying the deferred operations from the queue 220 to this index produces an index that is correct for the current time.

It is noted that the above examples are provided only for purposes of illustration and are not intended to be limiting. Other embodiments are also contemplated.

In another example, the index 240 is distributed across multiple memories 225. Because distributed system parts can fail independently, only part of the index may be lost. The systems and methods may be applied to each piece of the index independently, allowing just the lost part of the index to be restored.

In another example, this situation can be treated as a case where there is a "perfect" (or accurate) index for most of the key space, but only a stale index for part of the key space. The system can start reading the perfect part of the index into part one of the key space and the stale part of the index into part two of the key space, while rebuilding just the stale part of the index. As the rebuilt index part is loaded, the system can begin transitioning part two of the key space into part one of the key space.

In one example, when a block whose hash is in part two of key space 212 fails to be deduplicated, that block is stored in a new location and an index entry pointing to that location is stored in index 240. This entry may be considered trusted and its reference count may be relied upon.

The above examples have been described without regard to any duplication of entries (i.e., there is one entry for a given hash). In another example, however, there may be multiple entries for each hash key. Accordingly, looking up a hash may use the entry with the largest reference count and Delete/Add may modify the entry with the given physical address. It is noted that individual entries for the same hash may differ on whether those entries are trusted.

In another example, the index rebuilding process produces an index using what the logical address tables indicated while it scanned them. Accordingly, a snapshot may be made of the logical address tables before starting the rebuilding process, to insulate the rebuilding process from changes made while the rebuilding process is running.

In another example, the index rebuilding process may scan the changing logical address tables. In this example, scanning is performed in a synchronized manner, such that the deduplication engine only defers operations to queue 220 if those operations are related to modifying a logical address table entry that has already been scanned by the index rebuilding process. In other words, the index operations are separated into those that occur conceptually before index scanning (which are captured by the index rebuilding process), and those that occur after (which are captured by the deferred operation queue and performed on the rebuilt index).

Before continuing, it is noted that the systems and system architecture described above with reference to FIGS. 1, 2, and 2*a* are illustrative of various examples, and are not intended to be limiting in any way.

FIG. 3 is a flowchart illustrating exemplary operations which may be implemented for deduplication while rebuilding or loading indexes. Operations 300 may be embodied as logic instructions on a computer-readable medium or media. When executed on a processor, the logic instructions cause a general purpose computing device to be programmed as a special-purpose machine that implements the described operations. In an exemplary implementation, the components and connections depicted in the figures may be used.

With reference to FIG. 3, processing starts at 305, executing operations 310 and 320 in parallel. Operations 310 and 320 may operate in parallel, as shown in the flowchart. For example, operation 320 may begin before operation 310 finishes. That is, deduplicating data using the index may occur before loading the first group of index entries is completed. Likewise, data may deduplicate while loading the index entries. For example, part way through operation 310 (e.g., after 50% of the index is loaded), the system may deduplicate data (operation 320) against the index entries loaded thus far.

In operation 310, a first group of index entries is loaded into an index for deduplication. The first group of index entries may be a checkpoint of an earlier version of the index, and/or a checkpoint of an earlier version of the index merged with one or more logs. In an example, these index entries may be loaded into the first part of the index. In another example, the entire index key space may be placed in part one initially.

Loading the first group of index entries may include loading a second group of index entries into the index that are initially considered untrusted, adjusting the second group of index entries using log(s), and considering the index entries trusted after the adjusting is complete. The second group of index entries (being untrusted) may be loaded into the second part of the index. In another example, the entire index key space may be placed in part two initially. As the index entries are adjusted, the entries may be transitioned to part one.

In another example, loading the first group of index entries may include loading a second group of index entries that is initially considered untrusted into the index, computing a third group of index entries, loading the third group of index entries into the index, and replacing the loaded second group of index entries using the third group of index entries. Computing the third group of index entries may include inspecting logical address to physical address tables, and/or file manifests. Loading the second group of index entries and computing the third group of index entries may be in parallel. Loading the third group of index entries may also be in parallel with these operations, proceeding as entries become available. That is, as soon as some entries of the third group of index entries become available, those entries may be loaded. It is noted that not all of the second group of index entries may be loaded by the time the replacement happens. In that case, loading the second group of index entries may abort.

In operation 320, data is deduplicated using the index. Deduplicating data using the index may further include determining whether a block of data is a duplicate based in part on any index entries associated with a hash of the block of data. If any index entries associated with the hash of the block of data are untrusted, then at least one of the untrusted index entries is verified. In determining whether a block of data is a duplicate, operations do not rely on information that failed verification. Deduplicating data using the index may further include considering an entry that passed verification. Deduplicating data using the index may further include removing an index entry from the index because it failed verification.

Operations may further include associating with each index entry a count of how many references exist to the associated stored block. These counts may not be accurate for the index entries until loading the first group of index entries operation (310) has completed. Operations may also include deferring updates of the counts until loading the first group of index entries operation (310) is complete.

The operations shown and described herein are provided as examples. The operations are not limited to the ordering shown. Still other operations may also be implemented.

It is noted that the examples shown and described are provided for purposes of illustration and are not intended to be limiting. Still other examples are also contemplated.

The invention claimed is:

1. A method implemented in program code stored on a non-transient computer readable medium and executed by a processor for deduplicating while loading index entries, the method comprising:
  loading a first group of index entries into a stale index; and
  deduplicating data in a degraded mode using the stale index before loading the first group of index entries is completed.

2. The method of claim 1, wherein the first group of index entries is one of a checkpoint of an earlier version of the stale index, and a checkpoint of an earlier version of the stale index merged with one or more logs.

3. The method of claim 1, wherein the loading of the first group of index entries comprises:
  loading a second group of index entries into the stale index initially considered untrusted;
  adjusting, the second group of index entries using a log; and
  trusting the index entries after adjusting the second group is complete.

4. The method of claim 1, wherein the loading the first group of index entries comprises:
  loading a second group of index entries into the stale index initially considered untrusted;
  computing a third group of index entries;
  loading the third group of index entries into the stale index; and
  replacing the loaded second group of index entries.

5. The method of claim 4, wherein the computing of the third group of the index entries further comprises inspecting at least one of: logical address to physical address tables and file manifests.

6. The method of claim 1, wherein the deduplicating of data using the stale index further comprises:

determining whether a block of data is a duplicate based in part on any index entries associated with a hash of the block of data;

if any of the index entries associated with the hash of the block of data are untrusted, then verifying at least one of the untrusted index entries; and ignoring information failing verification in determining whether the block of data is a duplicate.

7. The method of claim 6, wherein deduplicating data using the index further comprises considering an index entry that passed verification.

8. The method of claim 6, wherein deduplicating data using the index further comprises removing an index entry that failed verification from the index.

9. The method of claim 1, further comprising associating with each index entry a count of references to an associated stored block, wherein the counts are not considered accurate until the loading the first group of index entries operation is complete.

10. The method of claim 9, further comprising deferring updates of the counts until the loading the first group of index entries operation is complete.

11. A storage system comprising:

an index loader configured to load index entries into a stale index for deduplication;

a deduplication engine configured to deduplicate data in a degraded mode while loading the index entries.

12. The storage system of claim 11, wherein the deduplication engine is further configured to:

divide a key space of the index into two parts, a first part operating in normal mode, and a second part operating in degraded mode; and move a first portion of the key space from the second part of the key space to the first part of the key space.

13. The storage system of claim 12, wherein the deduplication engine does not deduplicate a block of data when a hash of the block of data is in the second part of the key space.

14. The storage system of claim 12, wherein the deduplication engine associates with each index entry a count of references to an associated stored block, wherein the counts are not relied on for index entries with keys in the second part of the key space.

15. The storage system of claim 12, wherein the deduplication engine defers updates to index entries with keys in the second part of the key space.

16. The storage system of claim 15, wherein moving the first portion of the key space further comprises the deduplication engine applying the deferred updates for the index entries in the first portion of the key space.

17. The storage system of claim 12, wherein the deduplication engine deduplicates a block of data having a hash in the second part of the key space only after an associated index entry is verified.

18. The storage system of claim 17, wherein the index loader is configured to: load a first group of index entries into a part of the stale index corresponding to the second part of the key space; and wherein the deduplication engine initially considers the first group of index entries as untrusted.

19. The storage system of claim 18, wherein:

the index loader is further configured to:

compute a second group of index entries;

load the second group of index entries;

and wherein moving the first portion of the key space further comprises:

updating the first portion of the index based in part on the first portion of the entries belonging to the second group.

* * * * *